(12) United States Patent  
Liao

(10) Patent No.: US 8,248,519 B2  
(45) Date of Patent: Aug. 21, 2012

(54) BRIGHTNESS ADJUSTING SYSTEM AND METHOD THEREOF AND ELECTRONIC DEVICE USING SAME

(75) Inventor: Ming-Yang Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 156 days.

(21) Appl. No.: 12/772,923

(22) Filed: May 3, 2010

(65) Prior Publication Data

US 2010/0289930 A1    Nov. 18, 2010

(30) Foreign Application Priority Data

May 14, 2009   (CN) .......................... 2009 1 0302308

(51) Int. Cl.
*H04N 9/083* (2006.01)
(52) U.S. Cl. ................... 348/370; 348/333.01; 348/234; 348/229.1
(58) Field of Classification Search .................. None
See application file for complete search history.

(56) References Cited

U.S. PATENT DOCUMENTS

| | | | | |
|---|---|---|---|---|
| 2003/0214242 A1* | 11/2003 | Berg-johansen | ........... | 315/169.3 |
| 2005/0199815 A1* | 9/2005 | Murakumo et al. | ....... | 250/354.1 |
| 2006/0284788 A1* | 12/2006 | Robinson et al. | ............. | 345/3.1 |
| 2007/0273908 A1* | 11/2007 | Hoshii | .......................... | 358/1.9 |
| 2008/0180553 A1* | 7/2008 | Hassan-Shafique et al. | . | 348/234 |
| 2008/0244374 A1* | 10/2008 | Hattori | .......................... | 715/202 |
| 2009/0091744 A1* | 4/2009 | Lawrence et al. | ............... | 356/53 |

\* cited by examiner

*Primary Examiner* — Nhan T Tran
*Assistant Examiner* — Yih-Sien Kao
(74) *Attorney, Agent, or Firm* — Altis Law Group, Inc.

(57) ABSTRACT

A brightness adjusting system for an image of an object captured by a camera includes a plurality of light sources configured for emitting light to the object, a driving device driving the light sources to emit the light, and an adjustment device electrically connected to the camera and the driving device. The adjustment device pre-stores a plurality of standard brightness value ranges, analyzes a brightness distribution of the image, compares the brightness distribution of the image with the standard brightness value ranges, determines required adjustment of the brightness distribution of the image according to the comparison, and directs the driving device to drive the light sources to emit the light with a required intensity according to the required adjustment of the brightness distribution of the image.

9 Claims, 5 Drawing Sheets

BRIGHTNESS ADJUSTING SYSTEM AND METHOD THEREOF AND ELECTRONIC DEVICE USING SAME

BACKGROUND

1. Technical Field

The present disclosure relates to image capture and, particularly, to a brightness adjusting system, a method thereof, and an electronic device using the system.

2. Description of Related Art

Cameras connected to electronic devices through USB ports or embedded therein are used to capture images. However, the quality of the images is easily influenced by environment, such as ambient light.

Therefore, what is needed is a brightness adjusting system which can overcome the limitations described.

DETAILED DESCRIPTION

Figure 1:
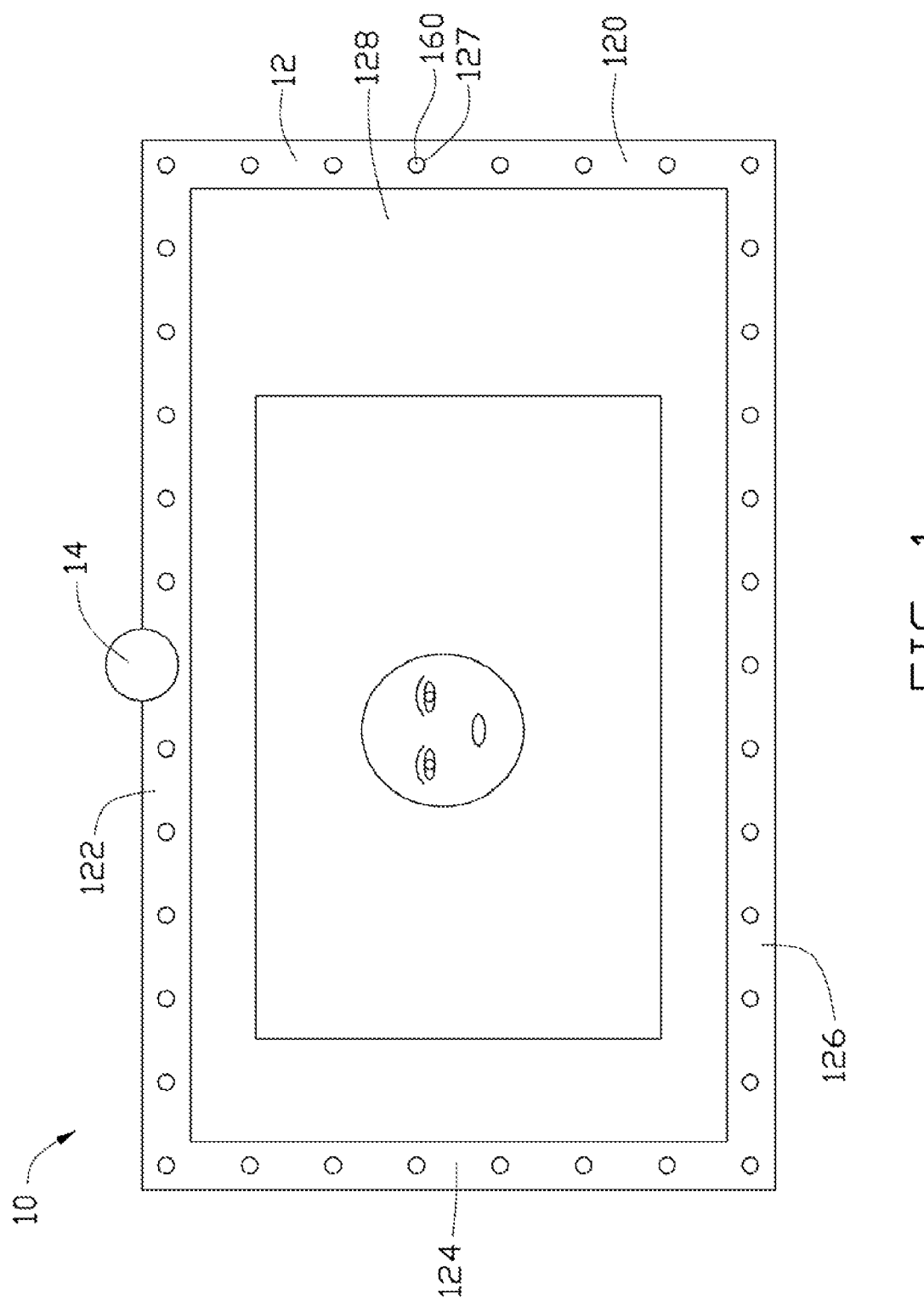
FIG. 1 is a schematic view of an electronic device including a brightness adjusting system, according to a first exemplary embodiment.
Figure 2:
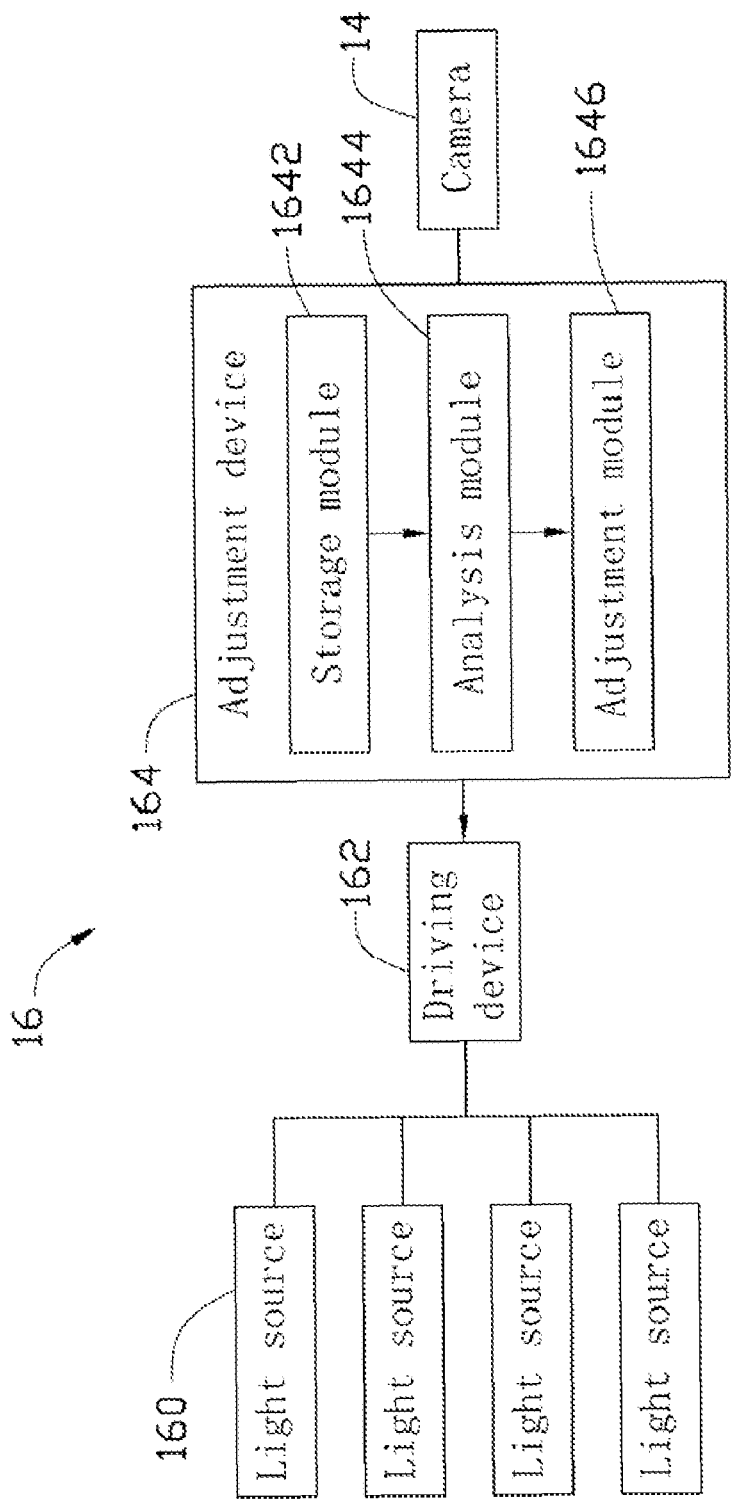
FIG. 2 is a functional block diagram of the brightness adjusting system of the electronic device of FIG. 1.

Referring to FIGS. 1 and 2, an electronic device 10, according to a first exemplary embodiment, includes a display screen 12, a camera 14, and a brightness adjusting system 16.

The display screen 12 is rectangular and includes a first side 120, a second side 122, a third side 124, and a fourth side 126. The first side 120, the second side 122, the third side 124, and the fourth side 126 connect to each other end to end in that order. A plurality of recesses 127 are defined in the four sides 120, 122, 124, 126 and arranged in a line in a respective side 120 (122, 124, 126). A display area 128 is cooperatively bounded by the four sides 120, 122, 124, 126.

The camera 14 may be a webcam connected to the electronic device 10 by a USB port or, connected to a network, such as an Ethernet network or a Wi-Fi network. In this embodiment, the camera 14 is embedded in the second side 122 for capturing images of an object in front of the display screen 12. The captured image is displayed in the display area 128.

The brightness adjusting system 16 includes a plurality of light sources 160 corresponding to the plurality of recesses 127, a driving device 162, and an adjustment device 164.

The light sources 160 are light emitting diodes received in the recesses 127. Each light source 160 is configured for emitting light to the object. In this embodiment, the light sources 160 are equally arranged on the four sides 120, 122, 124, 126 around the display area 128.

The driving device 162 is driving circuitry electrically connected to the light sources 160 and the adjustment device 164. The driving device 162 activates the light sources 160 to radiate light with different intensities according to voltages applied thereto.

The adjustment device 164, electrically connected to the camera 14 and the driving device 162, includes a storage module 1642, an analysis module 1644, and an adjustment module 1646.

The storage module 1642 is configured for pre-storing a plurality of standard brightness value ranges.

The analysis module 1644 is configured for receiving images captured from the camera 14, analyzing a brightness distribution thereof and comparing the brightness distribution of the image with the standard brightness value ranges. The adjustment module 1646 is configured for determining a required adjustment of the brightness distribution of the image and directing the driving device 162 to drive the light sources 160 to radiate the light with a required intensity according to the required adjustment of the brightness distribution of the image.

The driving device 162 is configured for selectively driving the light sources 160 using driving voltages, with image quality improved accordingly.

Figure 3:
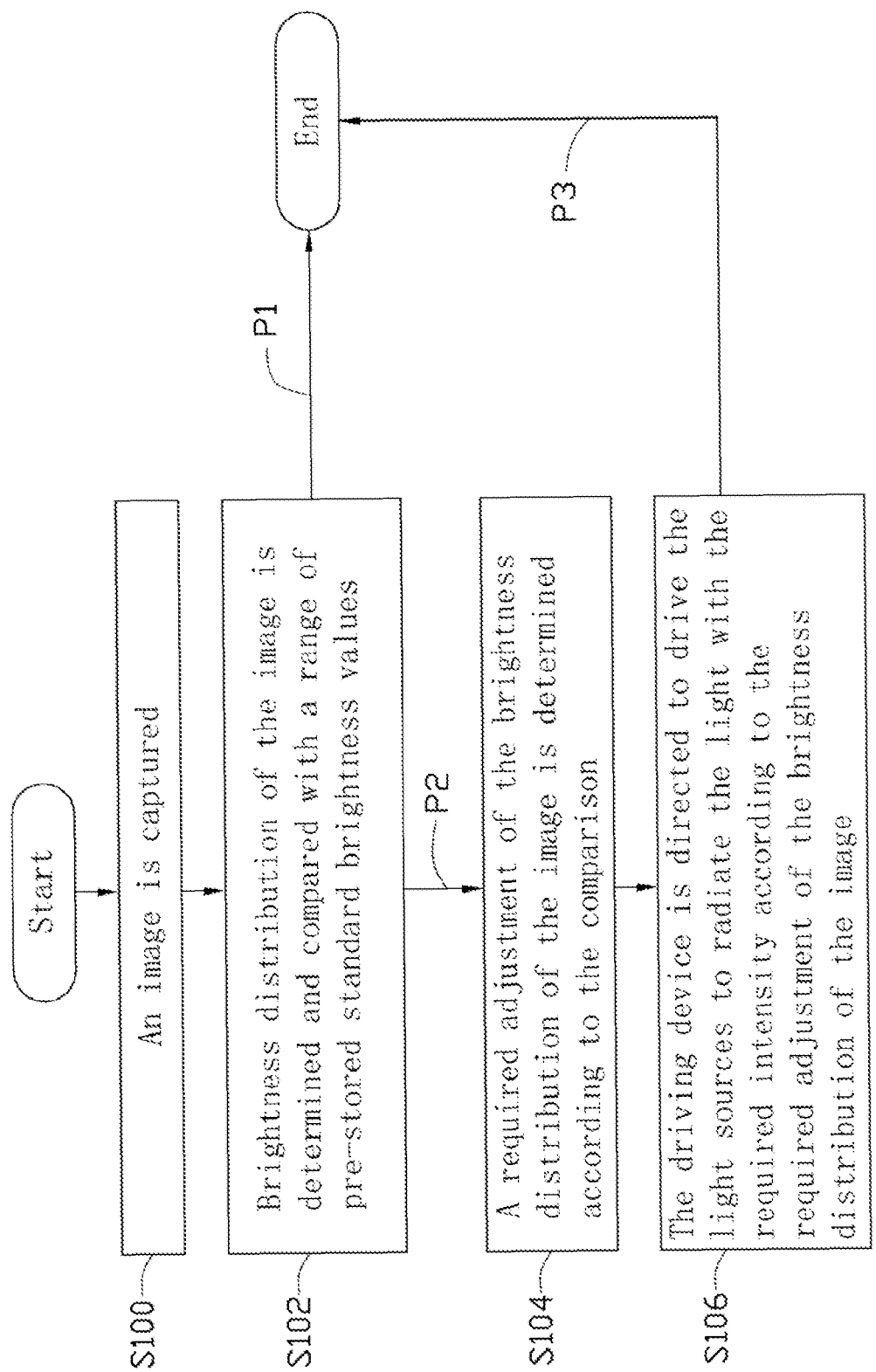
FIG. 3 is a flowchart of a brightness adjusting method of the brightness adjusting system of FIG. 2.

Referring to FIGS. 2 and 3, a brightness adjusting method can be implemented by, for example, the brightness adjusting system 16 and includes steps S100 through S106. In Step S100 an image is captured. In Step S102 brightness distribution of the image is determined and compared with a range of pre-stored standard brightness values. If the brightness distribution of the image is located in the corresponding standard brightness value range, the method follows path P1 to end. If the brightness distribution of the image is not in the corresponding standard brightness value range, the method follows path P2 to implement Step S104, in which a required adjustment of the brightness distribution of the image is determined according to the comparison. In Step S106 the driving device is directed to drive the light sources to radiate the light with the required intensity according to the required adjustment of the brightness distribution of the image. Image quality is improved. After Step S106, the method follows path P3 to end.

Figure 4:
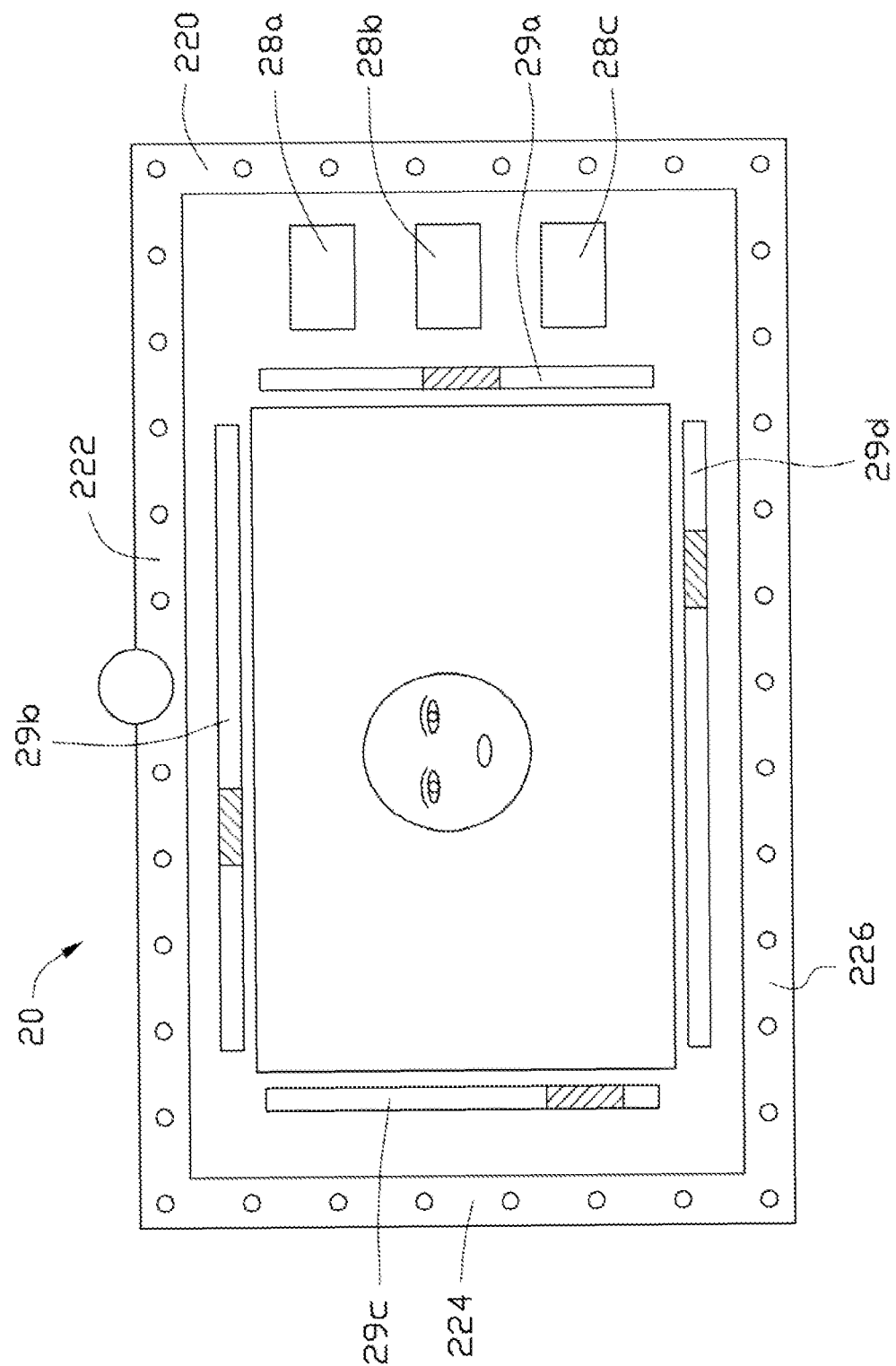
FIG. 4 is a schematic view of an electronic device including a brightness adjusting system, according to a second exemplary embodiment.
Figure 5:
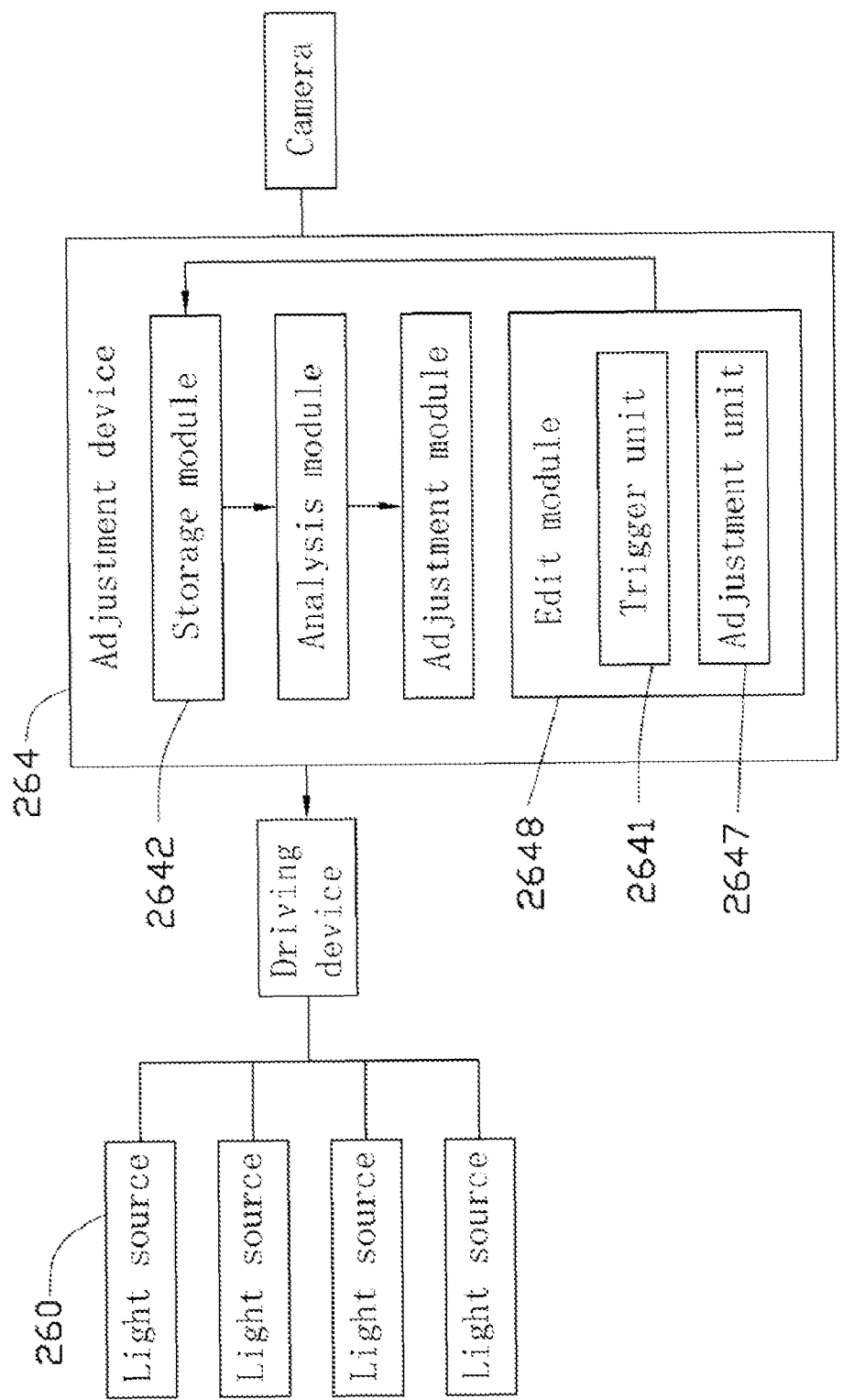
FIG. 5 is a functional block diagram of the brightness adjusting system of the electronic device of FIG. 4.

Referring to FIGS. 4 and 5, an electronic device 20, according to a second exemplary embodiment, is shown, differing from electronic device 10 of the first embodiment in the further inclusion of an edit module 2648.

The edit module 2648 is configured for editing a standard brightness value range and storing the edited standard brightness value range in the storage module 2642 according to input. The edit module 2648 includes a trigger unit 2641 and an adjustment unit 2467. The trigger unit 2641 includes a start button 28a, a save button 28b, and a holding button 28c. The trigger unit 2641 generates activation signals based on input of the start button 28a. For example, if the start button 28a is pressed, a starting signal for the trigger unit 2641 of the edit module 2648 is generated. The trigger unit 2641 then generates the activation signals to order the camera 14 to capture the image of the object. The image of the object is input and displayed on the display area 128. The adjustment unit 2467 can be manipulated to adjust the brightness of the image on the display area 128. The holding button 28c is then pressed to hold the image on the display area 128. When the brightness is satisfied, the save button 28b is pressed to save the brightness of the image in the storage module 2642 as the edited standard brightness value range. The adjustment unit 2467 includes a first scrollbar 29a, a second scrollbar 29b, a third scrollbar 29c, and a fourth scrollbar 29d shown in the display area 128 adjacent the four sides 220, 222, 224, 226, respectively. The adjustment unit 2467 is configured for adjusting the brightness value of the light sources 260 to provide a new standard brightness value range. In particular, after the start button 28a is pressed, the four scrollbars 29a, 29b, 29c, and 29d can be used to adjust the brightness value of the light sources 260, thereby adjusting the brightness of the captured image on the display area 128. If the first scrollbar 29a is pulled upward, the brightness value of the light sources 260 mounted to the first side 220 increases. If the second scrollbar 29b is pulled right, the brightness value of the light sources 260 mounted to the second side 222 increases. If the third scrollbar 29c is pulled upward, the brightness value of the light sources 160 mounted to the third side 224 increases. If the fourth scrollbar 29d is pulled right, the brightness value of the light sources 260 mounted to the fourth side 226 increases.

Advantages of the electronic device 20 of the second exemplary embodiment are similar to those of the electronic device 10 of the first exemplary embodiment. Furthermore, the edit module 2648 can edit different standard brightness value ranges to be stored in the storage module 2642. As a result, the brightness can be adjusted according to different environments.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A brightness adjusting system for adjusting brightness value of an image of an object captured by a camera, comprising:
   a display screen connected to the camera, the display screen defining a first side, a second side, a third side, and a fourth side connecting to each other end to end;
   a plurality of light sources configured for emitting light to the object, the plurality of light sources being mounted to the first, second, third and fourth sides of the display screen;
   a driving device driving the light sources to emit the light;
   an adjustment device electrically connected to the camera and the driving device and configured for pre-storing a plurality of standard brightness value ranges, analyzing a brightness distribution of the image, comparing the brightness distribution of the image with the standard brightness value ranges, determining required adjustment of the brightness distribution of the image according to the comparison, and directing the driving device to drive the light sources to emit the light with a required intensity according to the required requirement of adjustment of the brightness distribution of the image;
   wherein the adjustment device comprises a storage module, an analysis module, and an adjustment module, the storage module being configured for pre-storing the plurality of standard brightness value ranges, the analysis module being configured for analyzing the brightness distribution of the image and comparing the brightness distribution of the image with the standard brightness value ranges, and the adjustment module being configured for directing the driving device to drive the light sources to radiate the light with the required intensity according to the required adjustment of the brightness distribution;
   wherein the adjustment device further comprises an edit module configured for editing a standard brightness value range to be stored in the storage module;
   wherein the edit module comprises a trigger unit and an adjustment unit, the trigger unit being configured for triggering the edit module, and the adjustment unit being configured for adjusting a brightness value of the light sources to acquire the standard brightness value range to be stored in the storage module; and
   wherein the adjustment unit comprises a first scrollbar, a second scrollbar, a third scrollbar, and a fourth scrollbar corresponding to the first side, the second side, the third side, and the fourth side of the display screen, respectively, a brightness value of the light sources mounted to the first side of the display screen is adjusted by manipulating the first scrollbar, a brightness value of the light sources mounted to the second side of the display screen is adjusted by manipulating the second scrollbar, a brightness value of the light sources mounted to the third side of the display screen is adjusted by manipulating the third scrollbar, and a brightness value of the light sources mounted to the fourth side of the display screen is adjusted by manipulating the fourth scrollbar.

2. The brightness adjusting system as claimed in claim 1, wherein the light sources are light emitting diodes.

3. The brightness adjusting system as claimed in claim 1, wherein the driving device comprises driving circuitry, is electrically connected to the light sources and the adjustment device, and is configured for activating the light sources to radiate the light with different intensities according to voltages applied to the light sources.

4. The brightness adjusting system as claimed in claim 1, wherein the trigger unit comprises a start button configured for activating the edit module to order the camera to capture the image and the display screen to show the image, a holding button to holding the image on the display screen after adjustment of the brightness value of the light sources by manipulating the adjustment unit and a save button configured for saving a brightness distribution of the image hold on the display screen as the standard brightness value range.

5. An electronic device comprising:
   a camera;
   a display screen connected to the camera, the display screen defining a first side, a second side, a third side, and a fourth side connecting to each other end to end; and
   a brightness adjusting system for adjusting brightness value of an image of an object captured by a camera, comprising:
   a plurality of light sources configured for emitting light to the object, the plurality of light sources being mounted to the first, second, third and fourth sides of the display screen;
   a driving device driving the light sources to emit the light;
   an adjustment device electrically connected to the camera and the driving device and configured for pre-storing a plurality of standard brightness value ranges, analyzing a brightness distribution of the image, comparing the brightness distribution of the image with the standard brightness value ranges, determining required adjustment of the brightness distribution of the image according to the comparison, and directing the driving device to drive the light sources to emit the light with a required intensity according to the required adjustment of the brightness distribution of the image;
   wherein the adjustment device comprises a storage module, an analysis module, and an adjustment module, the storage module being configured for pre-storing the plurality of standard brightness value ranges, the analysis module being configured for analyzing the brightness distribution of the image and comparing the brightness distribution of the image with the standard brightness value ranges, and the adjustment module being configured for directing the driving device to drive the light sources to radiate the light with the required intensity according to the required adjustment of the brightness distribution;

wherein the adjustment device further comprises an edit module configured for editing a standard brightness value range to be stored in the storage module;

wherein the edit module comprises a trigger unit and an adjustment unit, the trigger unit being configured for triggering the edit module, and the adjustment unit being configured for adjusting a brightness value of the light sources to acquire the standard brightness value range to be stored in the storage module; and wherein the adjustment unit comprises a first scrollbar, a second scrollbar, a third scrollbar, and a fourth scrollbar corresponding to the first side, the second side, the third side, and the fourth side of the display screen, respectively, a brightness value of the light sources mounted to the first side of the display screen is adjusted by manipulating the first scrollbar, a brightness value of the light sources mounted to the second side of the display screen is adjusted by manipulating the second scrollbar, a brightness value of the light sources mounted to the third side of the display screen is adjusted by manipulating the third scrollbar, and a brightness value of the light sources mounted to the fourth side of the display screen is adjusted by manipulating the fourth scrollbar.

6. The electronic device as claimed in claim 5, wherein the display screen is rectangular, the display screen defining the first side, the second side, the third side, and the fourth side at four edges thereof.

7. The electronic device as claimed in claim 6, wherein the light sources are arranged in a line along the first, second, third and fourth sides of the display screen.

8. The electronic device as claimed in claim 6, wherein a plurality of recesses are defined in the four sides of the display screen and wherein the light sources are received in the recesses.

9. The electronic device as claimed in claim 8, wherein the light source are light emitting diodes.

* * * * *